(12) United States Patent
Valik et al.

(10) Patent No.: US 8,823,642 B2
(45) Date of Patent: Sep. 2, 2014

(54) METHODS AND SYSTEMS FOR CONTROLLING DEVICES USING GESTURES AND RELATED 3D SENSOR

(75) Inventors: Andrey Valik, Miass (RU); Pavel Zaitsev, Miass (RU); Dmitry Morozov, Miass (RU)

(73) Assignee: 3DiVi Company, Miass (RU)

( * ) Notice: Subject to any disclaimer, the term of this patent is extended or adjusted under 35 U.S.C. 154(b) by 220 days.

(21) Appl. No.: 13/478,378

(22) Filed: May 23, 2012

(65) Prior Publication Data

US 2013/0009861 A1 Jan. 10, 2013

(30) Foreign Application Priority Data

Jul. 4, 2011 (RU) .................................. 2011127116

(51) Int. Cl.
*G06F 3/01* (2006.01)
*G06F 3/03* (2006.01)
(52) U.S. Cl.
CPC .............. *G06F 3/0304* (2013.01); *G06F 3/017* (2013.01)
USPC .......................................... 345/156; 715/863
(58) Field of Classification Search
CPC ....... G06F 3/0304; G06F 3/011; G06F 3/012; G06F 3/013; G06F 3/017; G06F 3/0325; G06F 3/0346; G06K 9/00335; G06K 9/00342; G06K 9/00348; G06K 9/00355; H04N 13/0007; H04N 13/0074
USPC ................... 345/156–159, 173, 175; 715/863
See application file for complete search history.

(56) References Cited

U.S. PATENT DOCUMENTS

| | | | |
|---|---|---|---|
| 4,836,670 A * | 6/1989 | Hutchinson | 351/210 |
| 6,351,273 B1 * | 2/2002 | Lemelson et al. | 715/786 |
| 7,340,077 B2 | 3/2008 | Gokturk et al. | |
| 7,561,143 B1 * | 7/2009 | Milekic | 345/156 |
| 7,665,041 B2 | 2/2010 | Wilson et al. | |
| 7,775,439 B2 | 8/2010 | Kimber et al. | |
| 7,893,920 B2 | 2/2011 | Endoh | |
| 2003/0151592 A1 * | 8/2003 | Ritter | 345/156 |

(Continued)

FOREIGN PATENT DOCUMENTS

| | | |
|---|---|---|
| CA | 2615406 A1 | 6/2009 |
| CN | 101344816 A | 1/2009 |

(Continued)

OTHER PUBLICATIONS

English translation of JP 2009258884 A, retrieved Jun. 3, 2014.*

*Primary Examiner* — Nathan Danielsen
(74) *Attorney, Agent, or Firm* — Patent Jurist; Georgiy L. Khayet

(57) ABSTRACT

Provided are computer-implemented methods and systems for controlling devices using gestures and a 3D sensor that enables implementing the above. In one embodiment, the method proposed herein may be based on defining at least one sensor area within the space surrounding a user of a controlled device; associating this sensor area with at least one user gesture; associating the combination of the user gesture and sensor area with an actionable command; identifying the direction of the line of sight of the user and a focal point of the line of sight of the user; and, if the line of sight of the user is directed a sensor area, issuing an actionable command corresponding to the combination of the sensor area and the gesture that the user makes while looking at this sensor area.

24 Claims, 7 Drawing Sheets

(56) References Cited

U.S. PATENT DOCUMENTS

| | | |
|---|---|---|
| 2006/0187196 A1 | 8/2006 | Underkoffler et al. |
| 2007/0060336 A1 | 3/2007 | Marks et al. |
| 2007/0110298 A1 | 5/2007 | Graepel et al. |
| 2007/0139443 A1* | 6/2007 | Marks et al. .................. 345/629 |
| 2007/0260984 A1 | 11/2007 | Marks et al. |
| 2008/0070684 A1 | 3/2008 | Haigh-Hutchinson |
| 2009/0128555 A1 | 5/2009 | Benman |
| 2009/0158220 A1 | 6/2009 | Zalewski et al. |
| 2009/0172606 A1* | 7/2009 | Dunn et al. .................. 715/863 |
| 2009/0268945 A1 | 10/2009 | Wilson et al. |
| 2010/0020078 A1 | 1/2010 | Shpunt |
| 2010/0079413 A1* | 4/2010 | Kawashima et al. ......... 345/175 |
| 2010/0080464 A1* | 4/2010 | Sawai et al. .................. 382/190 |
| 2010/0118123 A1 | 5/2010 | Freedman et al. |
| 2010/0199228 A1 | 8/2010 | Latta et al. |
| 2010/0290698 A1 | 11/2010 | Freedman et al. |
| 2011/0029918 A1 | 2/2011 | Yoo et al. |
| 2011/0081969 A1 | 4/2011 | Ikeda et al. |
| 2011/0148868 A1 | 6/2011 | Chang et al. |
| 2011/0154266 A1* | 6/2011 | Friend et al. .................. 715/863 |
| 2011/0216059 A1 | 9/2011 | Espiritu et al. |
| 2011/0261178 A1* | 10/2011 | Lo et al. .......................... 348/68 |
| 2011/0289455 A1 | 11/2011 | Reville et al. |
| 2012/0056982 A1* | 3/2012 | Katz et al. ....................... 348/43 |
| 2012/0173067 A1* | 7/2012 | Szczerba et al. .............. 345/158 |

FOREIGN PATENT DOCUMENTS

| | | | |
|---|---|---|---|
| JP | 2009258884 A | * | 11/2009 |
| RU | 2382408 C2 | | 2/2010 |
| RU | 2410259 C2 | | 1/2011 |
| WO | 0163560 A1 | | 8/2001 |
| WO | 2011011029 A1 | | 1/2011 |
| WO | 2011045789 A1 | | 4/2011 |

* cited by examiner

METHODS AND SYSTEMS FOR CONTROLLING DEVICES USING GESTURES AND RELATED 3D SENSOR

RELATED APPLICATIONS

This application is Continuation-in-Part of Russian Patent Application Serial No. 2011127116, filed Jul. 4, 2011, which is incorporated herein by reference in its entirety for all purposes.

FIELD

This application relates generally to the techniques of contactless interaction with 3D sensors, and, more specifically, to the techniques of controlling various devices using gestures.

BACKGROUND

There are several techniques for controlling devices using gestures. The most possibilities for controlling devices using gestures are afforded by those techniques that allow for remotely capturing a three-dimensional (3D) image of the person making a gesture with his head, face, eyes, hands, and/or legs, as well as remotely capturing a 3D image of different changes in the posture of the user that can be interpreted as gestures.

However, most present solutions for controlling devices using gestures have rather limited capabilities as far as the processing power and resolution of these devices' 3D image-capturing systems are concerned. In most instances, this results in the inability of these systems to detect minor gestures (gestures made by the smaller body parts of the user) and perform face recognition.

In addition to the afore-mentioned limitations, the present solutions typically fail to distinguish between the casual gestures of the user and those gestures that are made meaningfully and are, thus, actionable. This makes the user spend some time on preparing for making a gesture, thereby significantly inconveniencing the user.

In addition, the limited capturing ability of the present solutions necessitates some preliminary training on behalf of the user in order to be able to operate the 3D sensor device, limits the user in the speed of gesturing, and makes him or her use only those gestures that are simple, emphasized, slow, easily recognizable, and reliably distinguishable from one another.

The above significant functional limitations detract severely from the user experience, while considerably confining the scope of application of the 3D sensor.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for controlling devices using gestures and a related 3D sensor that may enable implementing the method proposed herein. The proposed methods and systems for controlling devices using gestures and the related 3D sensor are aimed at dramatically improving the ability of 3D sensor to distinguish between the unintentional and deliberate gestures and to capture contemporaneous minor and major gestures, including those made with the user's hands, legs, fingers, and body, as well as at increasing the range of the gestures that can be captured, thereby enabling the user to make actionable gestures much faster.

In some example embodiments, an image of the user gesture may be captured and interpreted by the system to issue a command corresponding to this gesture to the controlled device. The space surrounding the user may be divided, in whole or in part, into one or more variously located and shaped segments, a location and/or shape of which may be meaningful to the 3D sensor. Such one or more segments are also referred to herein as "sensor areas" (not to be confused with the depth sensor device). Thus, in the space surrounding the user, at least one sensor area may be identified, which may be associated with at least one user gesture. Each combination of the user gesture and the corresponding sensor area may be associated with at least one command that is used to control the device.

In some example embodiments, the direction of a line of sight of the user may be identified as an imaginary straight line between a point between the eyes of the user and the focal point of the line of sight of the user. This may be done based on the position of the eyes of the user, an orientation of the head of the user, a position of a hand of the user, an angle of inclination of the head of the user, or a rotation of the head of the user, or by using other techniques.

In some example embodiments, it may be verified whether an object the user is currently viewing (i.e., the focal point of the line of sight of the user) terminates the line of sight. If the object currently being viewed by the user is identified as belonging to one of the sensor areas, the one or more gestures the user makes contemporaneously with viewing the object may be compared to predetermined gestures. Based on the comparison, one or more commands that are associated with the combination of the sensor area and predetermined gestures may be issued to the controlled device.

In some example embodiments, the 3D sensor proposed herein may include a calculation module, an IR-projector, and an IR-camera. The IR-projector and IR-camera may be coupled to the local bus of the calculation module. The calculation module may be configured to create structured lighting with the help of the IR-projector, analyze the captured 3D image provided by the processor, calculate the direction of the line of sight of the user, identify the sensor area intersecting the line of sight of the user, identify the one or more user gestures made contemporaneously with viewing the sensor area, and issue the corresponding command to the controlled device.

In further examples, the above steps of the method proposed herein are stored on a machine-readable medium including instructions, which, when implemented by one or more processors, perform the steps. In yet further examples, subsystems or devices can be adapted to perform the recited steps. Other features, examples, and embodiments are described below.

BRIEF DESCRIPTION OF DRAWINGS

Example embodiments are illustrated by way of example and not limitation in the figures of the accompanying drawings, in which like references indicate similar elements and in which.

DETAILED DESCRIPTION

Figure 1A:
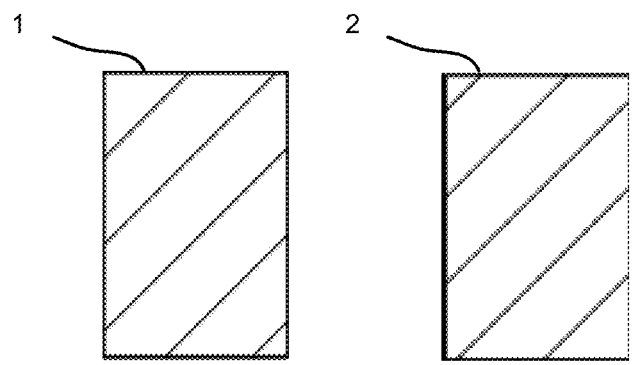
FIG. 1a illustrates two two-dimensional (2D), separate, rectangular, flat sensor areas.

Example methods and systems for controlling a device using gestures and a 3D sensor associated with the above methods and systems are described. For the purpose of explanation, the following description contains numerous specific details. These details are set forth in order to ensure a thorough understanding of the example embodiments. It will be evident, however, to one skilled in the art that the present invention may be practiced without these specific details. While some of the concepts are described in conjunction with specific embodiments, it will be understood that these embodiments are not intended to be limiting. In the simplest example embodiment of the method proposed herein, one sensor area may be associated with one gesture, which may allow mitigating the requirements for the accuracy of gesture recognition and enhancing performance of the 3D sensor.

In some example embodiments, multiple sensor areas may be used. In comparison to a single sensor area, using the multiple sensor areas may allow reducing the number of gestures simultaneously expected by a 3D sensor, which may, in turn, allow reducing the possibility of a false response, provoked by unintentionally issued commands or misclassification of similar gestures. It may be sufficient to associate similar gestures with different areas to avoid the possibility of confusion and the very necessity of selecting among such gestures. As a result, the requirements for gesture precision, amplitude of movement, and pauses between the gestures may be significantly mitigated. On the other hand, due to the plurality of the sensor areas and different commands corresponding to the same gesture in the different sensor areas, an extensive command menu may be implemented even with a small set of 3D sensor-recognizable gestures, or even with a single such gesture.

In some example embodiments, the sensor area may be 3D or 2D. In most embodiments, it may be more convenient to use the 2D flat sensor area (for example, rectangular in shape). It may be possible to simultaneously define one sensor area, or the multiple separate sensor areas, adjacent sensor areas, or overlapping sensor areas.

In some example embodiments, one or more command gestures may be associated with one single sensor area. This may enable the 3D sensor to issue commands in response to specific, predetermined gestures, thereby limiting the number of gestures expected by the 3D sensor and ensuring greater selectivity. In some example embodiments, a gesture and a sight of the user may be considered contemporaneous if some portions of the time intervals of the gesture and look fall within a predetermined common time interval. This may allow taking into account the difference in the duration of the gesture and the duration of the look which occurs as a result of long-continued gesticulation that is normally tiresome for a user.

In yet another example embodiment, the gesture and look may be considered contemporaneous if the time intervals of the gesture and the look have a common portion. In some example embodiments, to determine the direction of the look of the user, a conventional line of sight of the user may be used, which may coincide with a real line of sight of the user to a degree that is sufficient for the purposes of device control. It may be expedient to use a conventional line of sight for several reasons. Firstly, the true direction of the user's line of sight may be difficult to identify, as there is no confidence that the eyes of the user are directed to the same point as the point on which his or her attention is focused. Moreover, the left and the right eyes are not always directed to the same point. Secondly, all the known methods of determining where the look is directed are indirect methods, and, in this sense, all the said methods determine specifically a conventional direction of the look. In addition, with the conventional line of sight, the look, as such, may not be needed, as it may be sufficient to determine where the user would like to look when issuing a command. Thus, the method proposed herein may be also used by blind users.

In the same or other embodiments, the line of sight of the user may be considered to be a segment of an imaginary straight line that originates at a user eyes and ends on the object (sensor area) at which the user is currently looking. The point in the center of the area that is clearly visible to the user at a given moment in time is hereinafter referred to as a true focal point and may be used in some example embodiments to signify the intersection between the line of sight of the user and the object (sensor area) at which the user is currently looking.

In some example embodiments, a conventional focal point, which represents the true focal point identified with some imprecision but found within the area clearly visible to the user, may be used instead of the true focal point.

In some example embodiments, the focal point may be determined as the point of intersection between the conventional line of sight and the surface of the sensor area.

In some example embodiments, to locate the organ of vision of the user, the 3D coordinates of the centers of the eyes of the user in a captured 3D image may be calculated, and based on that, the 3D coordinates of his or her organ of vision may then be calculated. In those example embodiments, when the pupils or irises are not visible or, for some reason, cannot be located by the 3D sensor, the middle of an eye pit, or the middle of an eyeglasses lens, may be considered as the center of the eye. In some example embodiments, the direction of the line of sight of the user may be determined by may be defined by the orientation of the head of the user, for example based on the orientation of the nose of the user.

The orientation of the head of the user may be determined in different ways. The angles of the direction of the line of sight may be adjusted using 3D sensor calibration to take into account personal habits of the user, such as, for example, the habit of looking with his or her head slightly turned sideways or downwards. Due to this, users may be enabled to control a device in an accustomed and comfortable manner.

In some example embodiments, a beam coming from the organ of vision and crossing the point related to a hand of the user may be considered to be the line of sight. Incidentally, the line of sight may be determined by identifying a location of the organ of vision and a location of the hand of the user. These two locations or points may define a straight line considered to be the line of sight in this embodiment.

In some example embodiments, the direction of the look of the user may be calculated based on a position of pupils and/or contours of irises of the user, and the line of sight may be determined as a beam forwarded to the calculated direction of the user's look. When the pupils and/or contours of the irises cannot be recognized, the center of one of the user's eyes may be taken as the position of the eyes of the user.

In some example embodiments, a point on an interval joining the centers of the eyes of the user may be taken as the position of the eyes of the user. The location of the point on the interval may vary depending on the degree of vision binocularity of the user.

In some example embodiments, the line of sight may be determined based on predetermined manual or automatic calibration of the 3D sensor that is used to capture 3D images. In some example embodiments, the sensor area may be visualized by indicating contours, corners, or the whole surface of the sensor area by lighting devices, such as lamps, light-emitting diodes, a laser, a display, or a projector.

In some example embodiments, the sensor area may be linked to a moving item, such as a vacuum-cleaning robot. In this case, the sensor area may be moved synchronously with movements of the item associated with the sensor area.

In some example embodiments, the sensor area may be visualized using a display. Incidentally, the sensor area may be identified within the plane that matches the display surface. The sensor areas may be positioned within the display, at the borders and corners of the display, and outside the display (i.e., near, above, or below the borders of the display).

In some example embodiments, motions of the hand of the user and pointing device may be visualized on the display with the help of a pointer.

In some example embodiments, a horizontal movement of the hand of the user directed to the display having a number of graphical objects displayed on it may be associated with a scrolling command, while bending of fingers previously unbent and directing the bent fingers toward the sensor area associated with an object on the display may be associated with a command to select the object. In this or other embodiments, opening a palm that was previously clenched into a fist forming a pinch with the palm toward the object on the display may be associated with a command to maximize the object.

In some example embodiments, an elongated object held by a user may be used as a pointing device, and positions and movements of the pointing device may be analyzed. A single touch or repeated touching with a finger of the pointing device held by the rest of the fingers of the same hand may be recognized.

In some example embodiments, a movement of the focal point from outside to inside the display may cause a graphic object to show up on the display.

In some example embodiments, the gesture may be recognized based on an analysis of the user's fingers.

In some example embodiments, a user may be identified using a 3D image, and a user profile for the identified user may be activated.

In some example embodiments, the IR projector, IR camera, and the computing unit of the 3D-sensor may be installed in a common housing. A local bus may be used to connect the IR projector, IR camera, and computing unit of the 3D sensor. Coupling the IR projector to the IR camera using a local bus may significantly increase the rate of data transfer between the computing unit, IR projector, and IR camera compared with the external interface (USB and the like) connection used in the known 3D devices. This may allow accelerating the overall response of the controlled device to the controlling gestures.

In some example embodiments, the 3D sensor comprises a color video camera which may extend the possibility of using the 3D sensor usage to multimedia applications.

In some example embodiments of the 3D sensor with a color video camera, the 3D sensor computing unit may have an interface to transmit video to the display. The display may be a controlled device element, such as a TV set, a household appliance with a small LCD display, or a separate information output device (such as a computer monitor).

In some example embodiments, the display and the 3D sensor may be implemented in the same housing, and some 3D sensor components (for example, a color video camera) may be accommodated outside the common housing.

In some example embodiments, a permanent place may be provided for an accurate detachable fixing of the 3D sensor on the housing, or near the housing of the display. For example, the display housing may be made with a niche in the shape of the 3D sensor.

In some example embodiments, the IR camera and color video camera of the 3D sensor use liquid lenses electrically connected to the computing unit and capable of changing their focal distance at the command of the computing unit.

In some example embodiments, the computing unit of the 3D sensor may be configured to filter the 3D image, obtain a map of folded phases, transform it into a map of unfolded phases, calculate a map of depths, and calculate the 3D coordinates of limbs of the user.

In some example embodiments, 3D imaging may be performed by using modular IR lighting to illuminate the scene being captured and subsequently processing the captured image. The processing of the captured image may be performed by a special-purpose chip SoC (System on chip) and CPU. An LCD panel with FLCOS mirror base and an IR light source may be used for modular lighting.

An example of the best-mode embodiment of the method and 3D sensor proposed herein is using a system that basically comprises the 3D sensor connected to a display for interactive choice and reproduction of multimedia content received from the Internet.

Figure 1B:
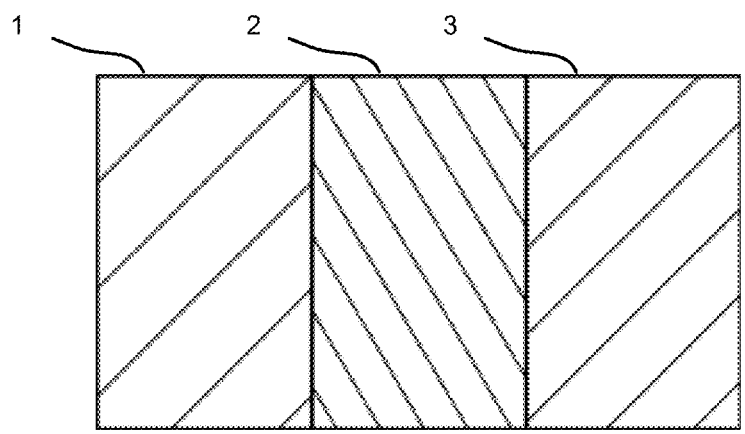
FIG. 1b illustrates three adjacent 2D, separate, rectangular, flat sensor areas.
Figure 1C:
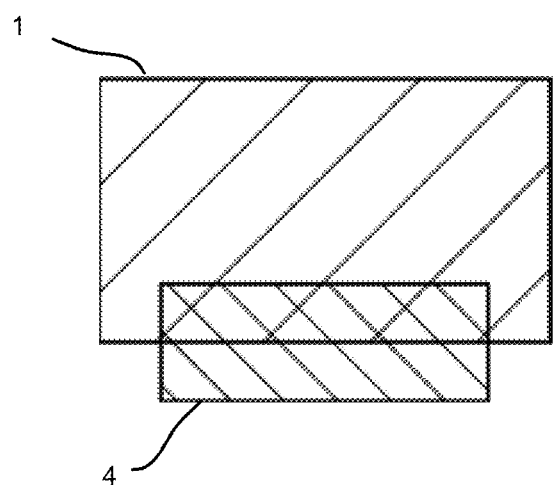
FIG. 1c illustrates two overlapping rectangular, flat sensor areas.

Referring now to the drawings, FIGS. 1a-1c show flat rectangular sensor areas that maybe located separately (as are the sensor areas 1 and 2 in FIG. 1a), may be adjacent to each other (as are the sensor areas 1, 2, and 3 in FIG. 1b), or which may overlap (as do the sensor areas 1 and 4 in FIG. 1c).

Figure 2A:
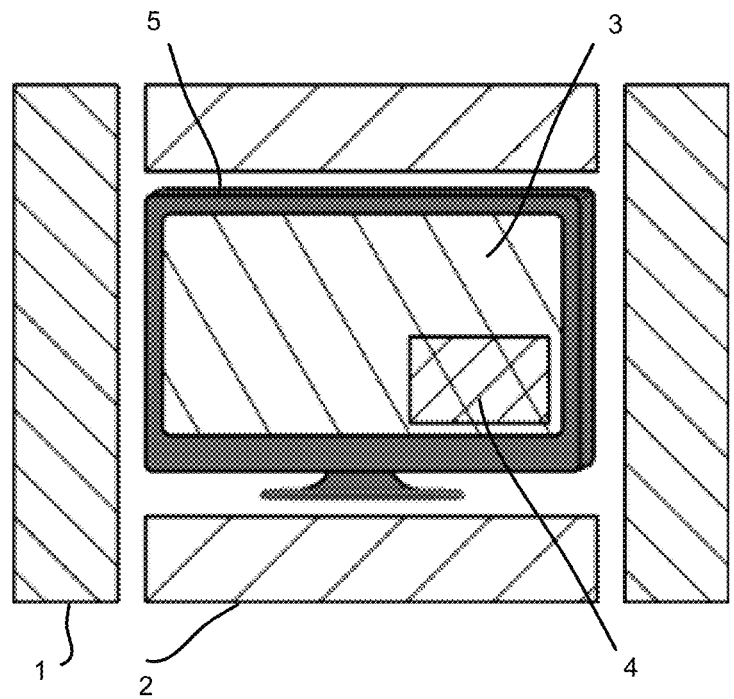
FIG. 2a is a schematic representation of how the sensor areas may be located in relation to the 3D device, including the device screen.
Figure 2B:
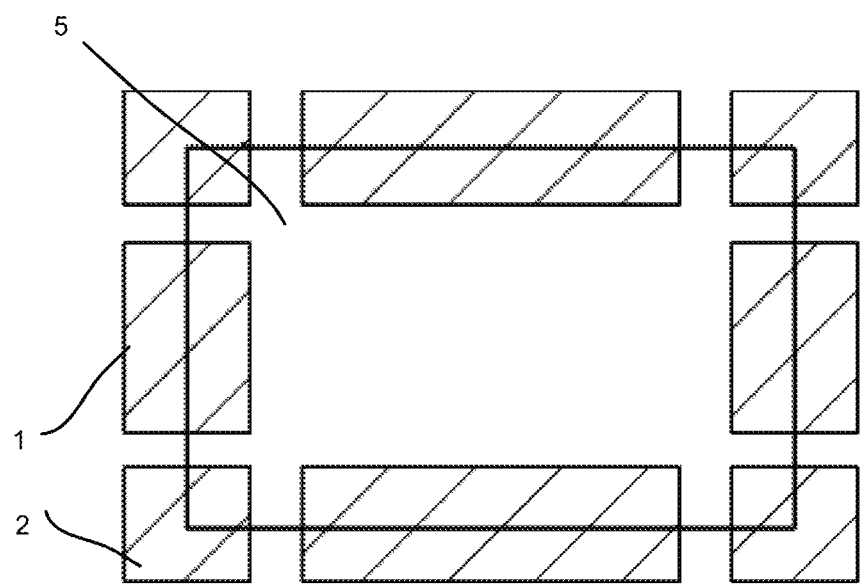
FIG. 2b is yet another schematic representation of how the differently shaped sensor areas may be located around the 3D device.

FIG. 2a-2b show possible arrangements of sensor areas linked to the display 5. The sensor areas may be arranged within the display 5 (as are the sensor areas 3 and 4 in FIG. 2a, for example), at the borders and corners of the display 5 (as are the sensor areas 1 and 2 in FIG. 2b, for example), and outside the display 5 (i.e., near, above, or below the borders of the display 5, as for example, the sensor areas 1 (near) and 2 (below) in FIG. 2a).

Figure 3A:
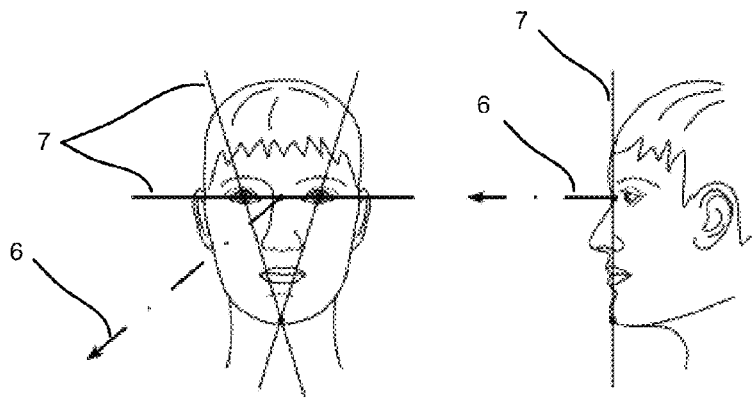
FIG. 3a illustrates the line of sight of the user identified based on an inclination of the head of the user and an angle of the turn of the face of the user.
Figure 3B:
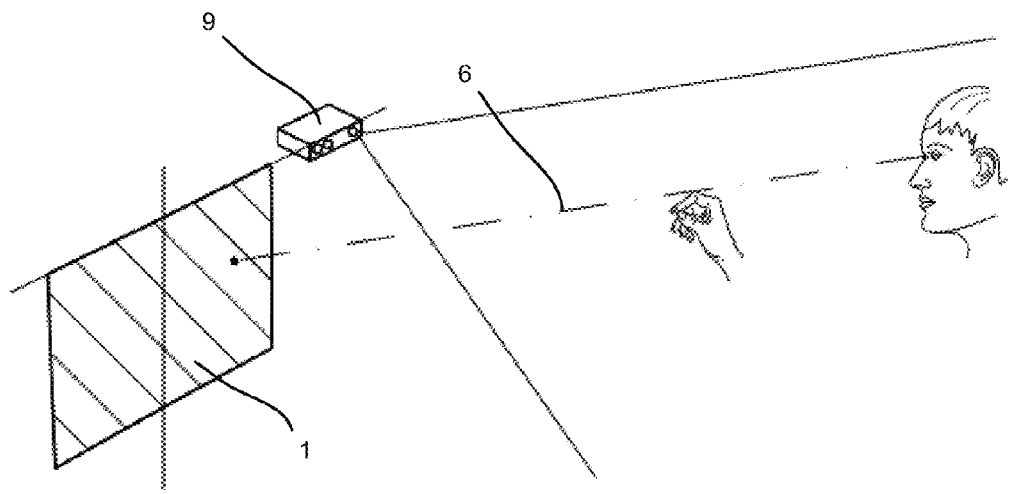
FIG. 3b illustrates the line of sight of the user identified as a beam aligned along a hand of the user.
Figure 3C:
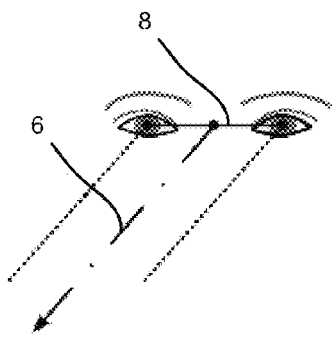
FIG. 3c illustrates the line of sight of the user calculated based on a position of the pupils of and/or a contour of the irises of the eyes of the user.

FIG. 3a-3c show the line of sight of the user determined in three different ways. According to the first method shown in FIG. 3a, the line of sight may be determined based on the angles of inclination and rotation of the user's head. For this purpose, the face, eyes, and chin of the user may be located within a captured image. 3D coordinates of the three points, and, namely, the centers of the eyes and chin, may define the plane 7 that passes through the above three points. The conventional line of sight 6 may be considered to be a perpendicular to this plane 7 drawn through the point taken as the position of the organ of vision.

According to the second method of determining the line of sight of the user as shown in FIG. 3b, the beam coming from the user's organ, crossing the point connected to the hand of the user, and directed to the point on the sensor area 1 may be taken as the line of sight 6. The line of sight 6 and the sensor area 1 may be determined by the 3D sensor 9.

According to the third method as shown in FIG. 3c, the line of sight 6 may be calculated based on the position of the pupils and/or contours of the irises of the user, and may be taken as a beam coming from the midpoint of the section 8 joining the centers of the eyes of the user. In some example embodiments, it may be convenient to consider the position of the organ of vision to be a certain point on the section 8 connecting the centers of the eyes and found between the end and the midpoint of the section (i.e., shifted toward one of the eyes).

Figure 4:
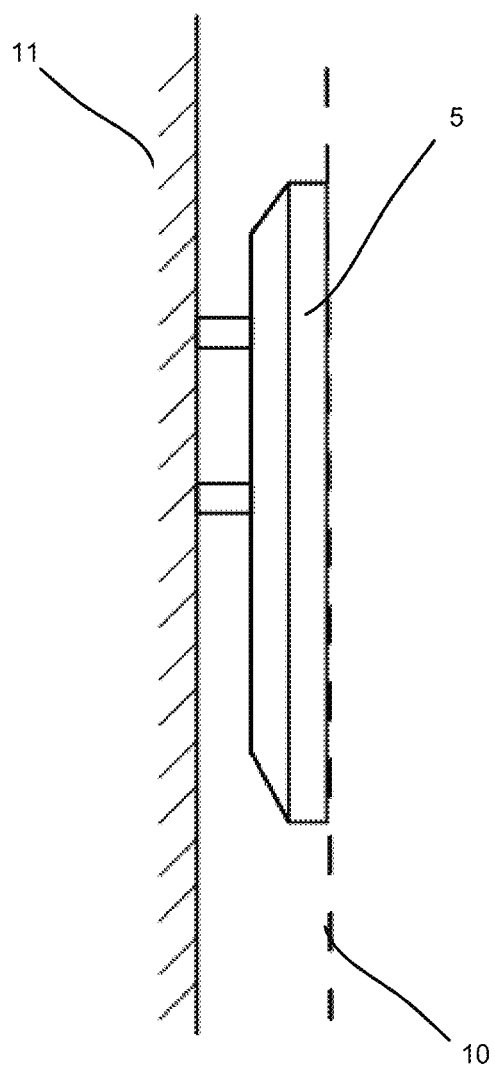
FIG. 4 illustrates the sensor area, located within the device screen that is fixed to a wall.
Figure 5A:
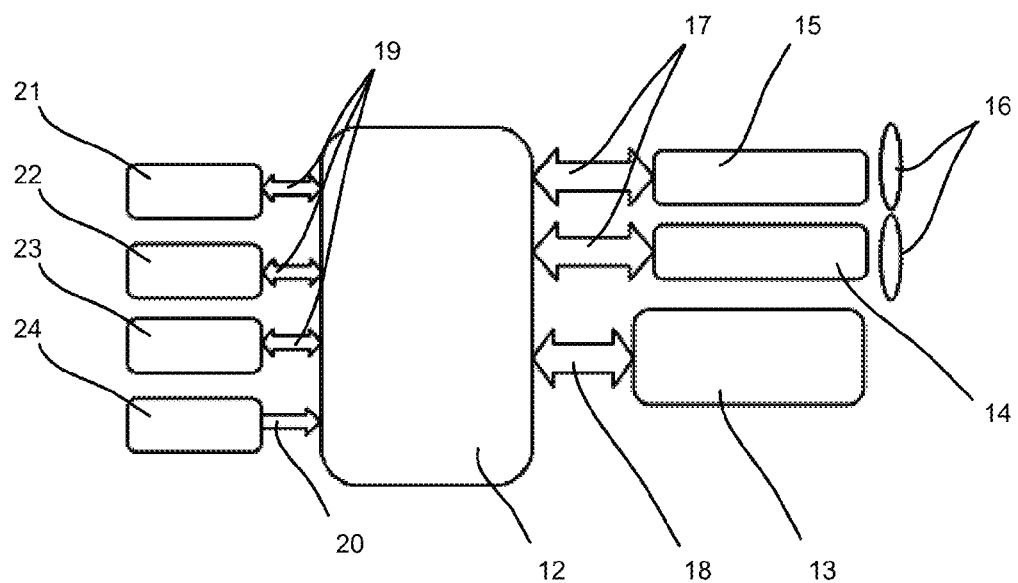
FIG. 5a is a functional diagram of the 3D sensor.

FIG. 4 shows the sensor area 10 coinciding with the surface of the display 5 attached to the wall 11. FIG. 5a is a functional diagram of the 3D sensor hardware component comprising the following elements: the computing unit 12 that is a base platform and may comprise a central processing unit; an image and sound processing module; a graphical processor to form a graphical user interface; an IR projector 13 with modulation that changes in space and time connected to the computing unit 12 through the local bus 17 of the PCI-E type; an IR camera 14 for 3D image capturing coupled to the computing unit 12 through the local bus 17 of the PCI-E type; a color camera 15 for color image capturing; the liquid lenses 16 for quick focusing of the color camera 15 and the IR camera 14; the HDMI interface module 18 for video image transmitting in HD format; an audio interface module 19; the module 20 for connecting to wire a LAN network and wireless Wi-Fi network; a power supply unit 21; a microphone 22 for receiving the scene sounds, in particular, those of the user's voice, which may be used, for example, to identify the user by their voice, or to issue additional voice commands; the IR receiver/transmitter 23 for controlling external devices; and the module 24 for connecting peripheral devices through a USB interface and SATA interface.

Figure 5B:
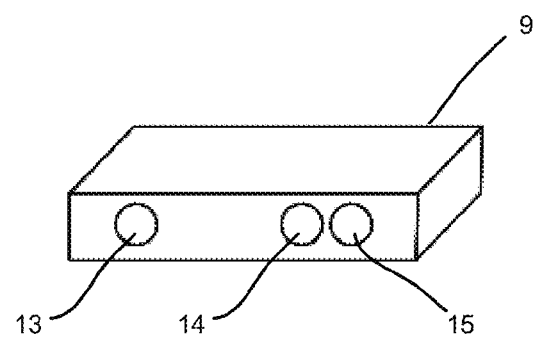
FIG. 5b is a schematic representation of the 3D sensor in the same housing with the IR-cameras and IR-projector.

FIG. 5b shows the 3D sensor in the common housing 9 with IR projector 13, IR camera 14, and color camera 15.

Figure 6:
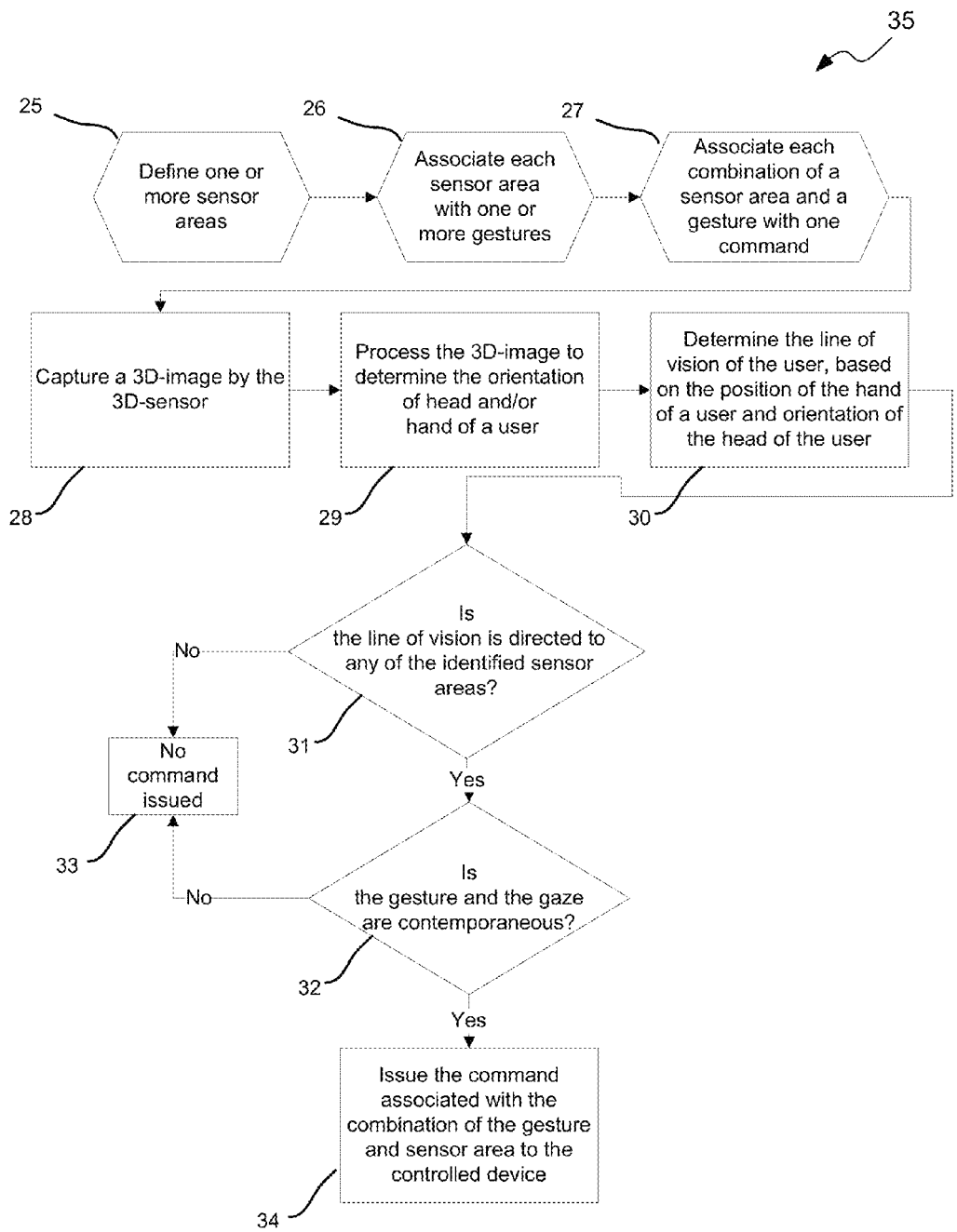
FIG. 6 is a process flow diagram showing a method for controlling devices using gestures.

FIG. 6 is a process flow diagram showing the method 35 for controlling devices using a combination of the line of sight and gesture gestures with the help of the 3D sensor. The method may commence at operation 25 with defining the one or more sensor areas in the space surrounding the user. At operation 26, each of the determined sensor areas may be associated with the one or more user gestures. At operation 27, each combination of the sensor area and gesture may be associated with one command. At operation 28, a 3D image may be captured by the 3D sensor and then be processed at operation 29 to determine orientation of the head of the user. Based on determined position of the hand of the user and orientation of the head of the user, the line of sight of the user may be determined at operation 30. After that, at operation 31, it may be verified whether the line of sight is directed to the sensor area. If so, at operation 32, the gesture made by the user with the hand of the user, including by operating the pointing device (for example, by clicking a button on the pointing device), or making a gesture with the pointing device, may be analyzed to determine whether the gesture was made contemporaneously with directing the line of sight to the sensor area. In some example embodiments, the gesture may be replaced with the user performing an event associated with one of the speech recognition techniques, or with a combination of the gesture made by the hand of the user and event associated with one of the speech recognition techniques.

If the gesture and the look are contemporaneous, the command, associated with this combination of the sensor area and the gesture made may be issued to the controlled device at operation 34. If the line of sight of the user is not directed to the sensor area, or the user gesture is not contemporaneous with the user looking at the sensor area, no command is issued at operation 33.

Figure 7:
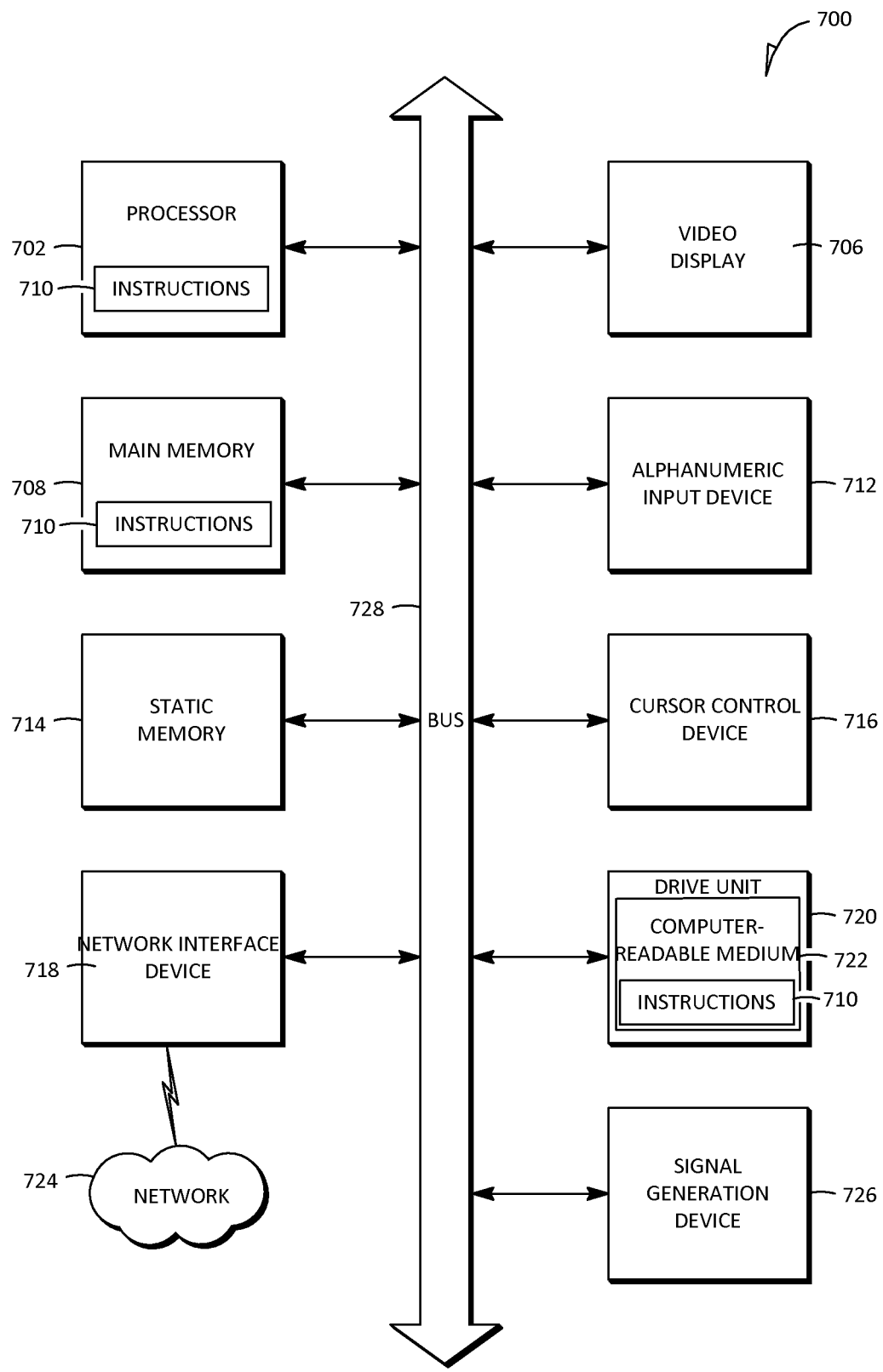
FIG. 7 is a diagrammatic representation of an example machine in the form of a computer system, within which a set of instructions for causing the machine to perform any one or more of the methodologies discussed herein is executed.

FIG. 7 is a diagrammatic representation of an example machine in the form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a CPU, a graphics processing unit (GPU), or both), and a main memory 708 and static memory 714, which communicate with each other via a bus 728. The computer system 700 may further include a video display unit 706 (e.g., a LCD). The computer system 700 may also include an alphanumeric input device 712 (e.g., a keyboard), a cursor control device 716 (e.g., a mouse), a voice recognition or biometric verification unit (not shown), a disk drive unit 720, a signal generation device 726 (e.g., a speaker) and a network interface device 718. The computer system 700 may further include a data encryption module (not shown) to encrypt data.

The disk drive unit 720 includes a computer-readable medium 722 on which is stored one or more sets of instructions and data structures (e.g., instructions 710) embodying or utilizing any one or more of the methodologies or functions described herein. The instructions 710 may also reside, completely or at least partially, within the main memory 708 or within the processors 702 during their execution by the computer system 700. The main memory 708 and the processors 702 may also constitute machine-readable media.

The instructions 710 may further be transmitted or received over a network 724 via the network interface device 718 utilizing any one of a number of well-known transfer protocols (e.g., Hyper Text Transfer Protocol (HTTP)).

While the computer-readable medium 722 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks (DVDs), random access memory (RAM), read only memory (ROM), and the like.

The example embodiments described herein may be implemented in an operating environment comprising software installed on a computer, in hardware, or in a combination of software and hardware.

Although the embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for controlling a device using gestures, the method comprising:
    capturing a three-dimensional (3D) image associated with a user of the device;
    identifying whether a line of site of the user is directed towards a predetermined area in a space surrounding the user, the predetermined area being a sensor area, the line of sight being an imaginary straight line between a position of eyes of the user and an object that the user views, wherein the line of sight is a beam crossing a point associated with a hand of the user;
    identifying a gesture made by the user substantially contemporaneously with the current line of sight;
    comparing the gesture to one or more predetermined gestures associated with the sensor area; and
    based on the comparison, selectively providing to the device a command corresponding to the combination of the sensor area and the gesture,
    wherein the sensor area is substantially flat and is disposed within a same plane as a display communicatively coupled to the device, wherein the sensor area includes a sensor area located outside the display and a sensor area adjacent with a boundary of the display.

2. The method of claim 1, wherein the direction of the line of sight is determined based on one or more of the following: position of the eyes of the user, an orientation of a head of the user, a position of a hand of a user, an angle of inclination of the head, and a rotation of the head.

3. The method of claim 1, wherein the direction of the line of sight is calculated based on a position of the pupils and/or a contour of the irises of the eyes.

4. The method of claim 1, wherein determination of the line of sight is based on a predetermined manual or automatic calibration of a 3D sensor being used to capture the 3D image.

5. The method of claim 1, wherein a center of one of the eyes of the user is taken as the position of eyes.

6. The method of claim 1, wherein a point on an interval connecting centers of eyes of the user is taken as the position of eyes.

7. The method of claim 1, wherein the sensor area further includes a sensor area located within the display.

8. The method of claim 7, wherein a pointer is displayed on the display and moved on the display in accordance with motions of a hand or a pointing device.

9. The method of claim 7, wherein a pointer is displayed on the display and moved in accordance with motions of a focal point of the vision line.

10. The method of claim 1, further comprising determining a focal point of the vision line and tracking the focal point.

11. The method of claim 10, wherein a movement of the focal point from outside to inside the display, a graphic object is displayed on the display.

12. The method of claim 11, wherein a horizontal movement of a hand directed to the display displaying a number of graphical objects is associated with a scrolling command.

13. The method of claim 1, wherein the gesture is recognized based on an analysis of fingers of the user.

14. The method of claim 13, wherein bending of fingers previously unbent and directed toward the sensor area connected to an object on a display is associated with a command to select an object.

15. The method of claim 13, wherein opening a palm, previously clenched in a fist or a pinch, towards an object on a display, is associated with a command to maximize the object.

16. The method of claim 1, wherein a position and a movement of a pointing device held by the user is analyzed with any elongated object being used as the pointing device.

17. The method of claim 16, wherein single or multiple touches by a finger of the pointing device held by the rest of the fingers of the same hand are recognized.

18. The method of claim 1, wherein a face is recognized and the user is identified based on the 3D image.

19. A system for controlling a device using gestures, the system comprising:
    an infrared (IR) projector to generate modulated light;
    an IR camera to capture a three-dimensional (3D) image associated with a user of the device; and
    a computing unit communicatively coupled to the IR projector and the IR camera, the computing unit being configured to analyze the 3D image and, based on the analysis, to:
    identify whether a line of site of the user is directed towards a predetermined area in a space surrounding the user, the predetermined area being a sensor area, the line of sight being an imaginary straight line between a position of eyes of the user and an object that the user views, wherein the line of sight is a beam crossing a point associated with a hand of the user,
    identify a gesture made by the user substantially contemporaneously with the current line of sight,
    compare the gesture to one or more predetermined gestures associated with the sensor area; and
    based on the comparison, selectively provide to the device a command corresponding to the combination of the sensor area and the gesture,
    wherein the sensor area is substantially flat and is disposed within a same plane as a display communicatively coupled to the device, wherein the sensor area includes a sensor area located outside the display and a sensor area adjacent with a boundary of the display.

20. The system of claim 19, wherein in order to analyze the 3D image, the computing unit is configured to:
    filter the 3D image; receive a map of folded phases;
    transform the map of folded phases into a map unfolded phases;

calculate a map of depths; and calculate 3D coordinates of parts of a body of the user.

21. The system of claim 19, further comprising a color video camera.

22. The system of claim 21, wherein the IR projector, color video camera, and IR camera are installed in a common housing.

23. The system of claim 21, wherein the color video camera and/or the IR camera are equipped with liquid lenses.

24. The system of claim 19, wherein the computing unit is equipped with an interface to transmit a video signal to a display.

* * * * *